UNITED STATES PATENT OFFICE.

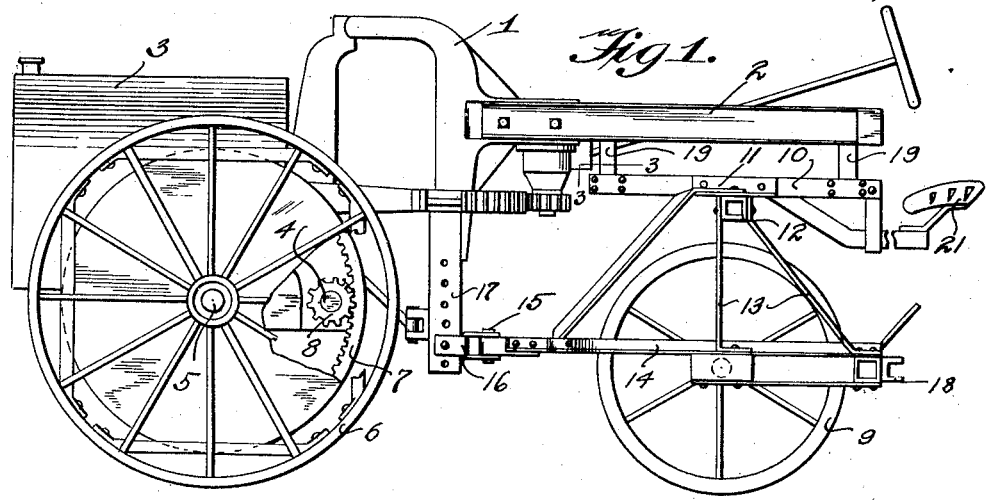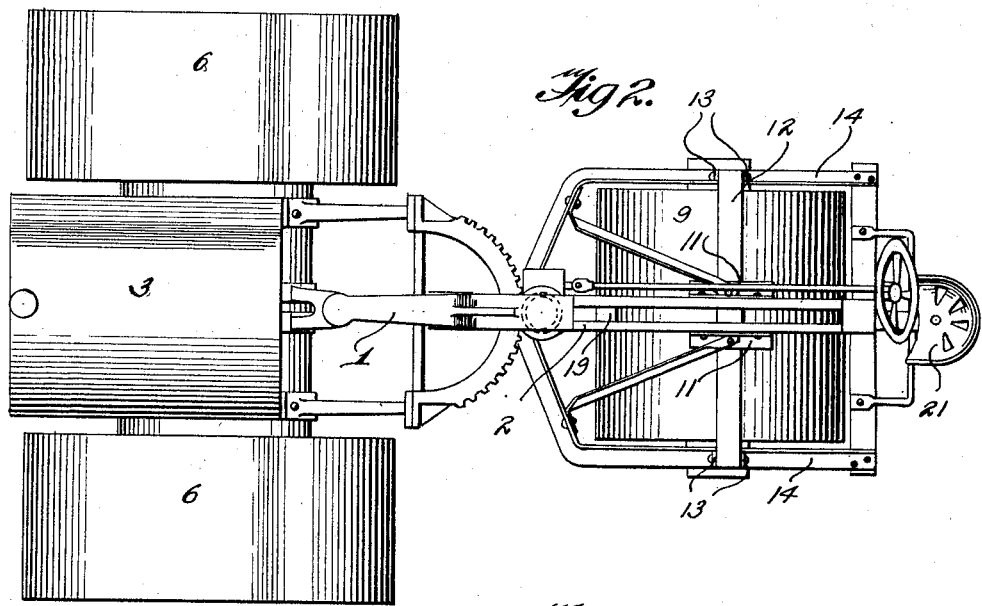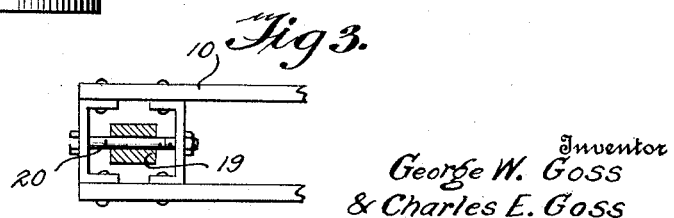

GEORGE W. GOSS AND CHARLES E. GOSS, OF BALTIMORE, OHIO.

FARM IMPLEMENT.

1,389,652.  Specification of Letters Patent.  Patented Sept. 6, 1921.

Application filed December 17, 1919. Serial No. 345,674.

*To all whom it may concern:*

Be it known that we, GEORGE W. Goss and CHARLES E. Goss, citizens of the United States, residing at Baltimore, in the county of Fairfield and State of Ohio, have invented certain new and useful Improvements in Farm Implements, of which the following is a specification.

This invention relates to improvements in mechanically driven farm implements, and has particular reference to tractors; the object of the invention being to provide a tractor with an improved and novelly situated leveling roller, which is so disposed as to span the gap existing between the inner edges of the driving wheels of said tractor, said leveling roller further being so positioned with respect to the drive gearing of the tractor that the passage of the wheels and roller over the ground will result in evenly packing the ground over the width of the tractor, this result being achieved by the application of uniform weight and pressure to said wheel elements, and to prevent the latter from forming furrows or tracks in the soil traversed thereby.

In the operation of the average tractor, it has been found that the drive or power wheels thereof receive the full weight of the machine with the result that the tractive efforts of said wheels, combined with the weights imposed thereon, produce ruts or relatively deep furrows in the soil, particularly when the latter is soft or sodden, and these ruts are spaced apart a distance equaling that which exists between the inner edges of the wheels. These ruts interfere with the successful operation of the plows, harrowing disks or other implements drawn by the tractor, and prevent such implements from operating in a completely uniform manner. Therefore, through the provision of the roller above mentioned, the soil over which the tractor operates will be subjected uniformly to the weight of the machine and hence the presence of such ruts or wheel grooves will be entirely avoided.

Another object of the invention resides in the provision of a tractor wherein is embodied a longitudinally extending frame, which latter is formed with an overhanging rear portion, engine driven drive wheels are carried by the forward portion of said frame while the rear overhanging end thereof is provided with a leveling roller, which is adapted in conjunction with said drive wheels to receive the weight of the tractor, the drive mechanism between the engine and the drive wheels being of such nature that upon the advance of the tractor, the pressure created by the tractive effort of the machine will be substantially equally imposed upon both of said wheels and said roller, thus causing the soil traversed by the machine to be evenly and uniformly leveled.

With these and other objects in view, as will appear as the description proceeds, the invention accordingly consists in the novel features of construction, combinations of elements and arrangement of parts hereinafter to be fully described and to have the scope thereof pointed out in the appended claims.

In the accompanying drawings, forming a part of this specification, and in which similar characters of reference denote like and corresponding parts:

Figure 1 is a side elevation of a tractor constructed in accordance with the principles of the present invention.

Fig. 2 is a top plan view thereof, and,

Fig. 3 is a detailed horizontal sectional view taken along the line 3—3 of Fig. 1.

The form of tractor shown in the accompanying drawing consists essentially of a longitudinally extending frame 1, which may be of any desired construction and in this instance is formed to provide an overhanging rear portion 2. The forward end of the frame is provided with the usual power plant or engine 3 which is suitably geared so as to rotate a transversely journaled differential shaft 4. Loosely mounted for rotation upon the stud axle 5, also carried by the forward end of the frame 1 is a pair of drive wheels 6 which perform the dual capacity of driving the tractor and also effecting its steering. As usual, these wheels are equipped with rigid gear wheels 7, which are provided with internal teeth, the latter being disposed to mesh with the teeth of spur gears 8 provided upon the outer ends of the shaft 4. By virtue of this construction, it will be manifest that power may be delivered to the drive wheels from the engine 3. Also by controlling the application of power in an alternate manner to said wheels, the steering movements of the tractor may be effected. The construction so far described in itself does not form the present invention and is to be found in tractors of common use.

It has been found in practice that the heavy drive wheels 6 are very apt and do sink into the soil to such extent that relatively deep ruts or grooves are formed thereby, so that the implements trailing the tractor are obliged to operate over uneven soil and in this manner their utility and efficiency is detrimentally affected. However, through the instrumentality of the features of the present invention, this defect or objection is substantially eliminated and the operation of the trailing implements will be accordingly left free and unhampered. To this end, use is made of a leveling roller 9, which is suitably carried beneath the overhanging rear portion of the frame 2 and is adapted to support the weight of the tractor in conjunction with the drive wheels 6. This roller, as shown in Fig. 2, is of a width substantially equal to that of the space existing between the inner edges of the drive wheels, in order that the soil normally left untouched by tractors of common construction will be leveled by means of said roller. Further, the roller 9 is so positioned as to relieve the drive wheels upon the advance of the tractor, of the excessive pressures which said wheels when used by themselves normally receive. It will be observed that the gearing 7 and 8 is so disposed that upon the advance of the tractor, the rear end 2 of the frame will be forced in a downwardly direction, that is to say, the tooth pressure between the parts 7 and 8 is such as will normally tend to force the rear portion downwardly upon the forward movement of the tractor. The present invention takes advantage of this action on the part of the drive gearing by situating the roller 9 beneath the rear portion of the frame 1, so that such downwardly rocking motion on the part of said frame will result in the application of pressure to the soil by reason of the roller 9, and in fact, this pressure is so evenly distributed that it will be substantially equal in both the wheels 6 and the roller 9. Obviously, this equalized pressure will prevent any of the wheel elements from forming grooves, ruts or furrows on its own behalf, and it follows that by so equalizing the pressure throughout the width of the tractor, a uniform leveling of the soil traversed by said tractor will be effected. Of course, if the direction of movement of the tractor is reversed, that is to say if the tractor is moved rearwardly, the action of the roller 9 will be rendered ineffective, however, such reverse movement if of no particular consequence, inasmuch as it is seldom employed and even when used, the tractor is ordinarily negotiating turns or engaged in other conditions wherein the real use of the roller 9 is not essential. From the foregoing it will be manifest that the underlying principle of the invention resides in locating the roller 9 beneath the rear end of a superimposed tractor frame and in such location with respect to the drive gearing of the tractor as will tend to force said roller downwardly upon the advance of the machine. When this distinction is clearly recognized, the difference between the present invention and an ordinary power driven roller will be rendered apparent.

It is obvious that many ways may be provided for mounting the roller 9 in connection with the frame 1, and that such mountings will of necessity change by the adaptation of said roller to tractors of different forms. However, in the present type of tractor, which is of the so called "Moline" type of machine, the rider bar 10 of the tractor is provided with rigid angle brackets 11, and to these brackets there is bolted a transversely extending bar 12. As shown in Figs. 1 and 2, the outer ends of the bar 12 are provided with depending brace bars 13, which have the lower ends suitably connected to a substantially rectangular horizontally situated frame 14, in which the roller 9 is journaled. The forward end of frame 14 is secured by means of a vertical bolt 15 with an adjustable securing member 16, the latter being carried in connection with a depending draft device 17 rigidly connected with a frame 1. By virtue of this construction, it will be apparent that a positive, substantial and secure mounting is provided for the roller 9 and the movement of the latter in connection with the frame is absolutely insured. Further, the mounting is of an exceptionally staunch nature so that the roller will be capable of receiving the stresses imparted thereto during the advance movements of the tractor. If desired, the rear end of the frame 14 may be equipped with a plate 18 by means of which implements, such as plows, harrows, disks or the like, may be connected with and drawn by the tractor. The rider bar 10 is pivotally suspended in the ordinary manner, and this is accomplished by means of vertical supports 19, which depend from the rear portion 2 of the frame 1. The lower end of the supports 19 receive longitudinally extending bolts 20 which are rigidly carried by the rider bar structure. By the provision of the bolts 20, the seat structure 21 connected with the rider bar may maintain its equilibrium without responding to the lateral tilting movements of the tractor.

From the foregoing description taken in connection with the accompanying drawing, it will be seen that there is provided a tractor, or a tractor attachment, which is capable of operating on such manner as to avoid forming ruts or wheel tracks in the soil over which the tractor operates. By accomplishing this object in the manner stated, implements drawn by the tractor will be left free to operate with maximum efficiency and all unevenness in their depth of cutting will as a result be avoided.

What is claimed as new and patentable is:

1. In a tractor, the combination with the frame thereof, an engine carried by the forward end of said frame, drive wheels mounted for rotation adjacent to the forward end of the frame, a land roller structure carried by and situated beneath the rear end of said frame, said roller structure being of such length as to bridge the distance between the inner edges of said wheels, and driving means for transmitting the power of said engine to said wheels, said means operating upon the advance of the tractor to force said roller downwardly.

2. In a tractor, the combination with a longitudinally extending frame formed to include an overhanging rear portion, an engine carried by said frame, a pair of spaced drive wheels connected with said frame, a land roller structure carried beneath the rear overhanging portion of said frame, said roller structure being of such width as to substantially bridge the distance between the inner edges of said drive wheels, and power transmitting mechanism between said engine and said wheels, said mechanism operating upon the advance of the tractor to force said roller toward the soil.

3. In a tractor, the combination with the frame thereof, an engine carried by said frame, spaced drive wheels carried by the forward end of said frame, means for transmitting power from said engine to said drive wheels, and a roller structure positioned beneath the rear end of said frame, said roller structure being of a width equaling that of the distance between the inner edges of said wheels and capable of receiving in conjunction with said drive wheels the pressures created by the application of power to said drive wheels.

4. In a tractor, the combination with a longitudinally extending frame formed to include an overhanging rear portion, an engine carried by said frame, a pair of spaced drive wheels carried by the forward end of said frame, spur gearing between said engine and said drive wheels, said gearing serving upon the advance of said tractor to oscillate the rear overhanging end of said frame in a downward direction, a rigid mounting depending from the rear end of said frame, and a roller element journaled within said mounting and capable of receiving the pressures created by said spur gearing.

In testimony whereof we affix our signatures.

GEORGE W. GOSS.
CHARLES E. GOSS.